US006959326B1

United States Patent
Day et al.

(10) Patent No.: US 6,959,326 B1
(45) Date of Patent: Oct. 25, 2005

(54) METHOD, SYSTEM, AND PROGRAM FOR GATHERING INDEXABLE METADATA ON CONTENT AT A DATA REPOSITORY

(75) Inventors: Don Rutledge Day, Austin, TX (US); Rabindranath Dutta, Austin, TX (US); David Allen Schell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 09/645,386

(22) Filed: Aug. 24, 2000

(51) Int. Cl.[7] .............................................. G06F 15/16
(52) U.S. Cl. ...................... 709/217; 709/203; 709/229; 707/3
(58) Field of Search ................................ 709/203, 218, 709/217, 229, 202, 219; 707/3, 10

(56) References Cited

U.S. PATENT DOCUMENTS

| | | | |
|---|---|---|---|
| 5,675,785 A | | 10/1997 | Hall et al. |
| 5,715,453 A | * | 2/1998 | Stewart ....................... 715/513 |
| 5,721,903 A | | 2/1998 | Pham et al. |
| 5,873,076 A | * | 2/1999 | Barr et al. ...................... 707/3 |
| 5,935,210 A | * | 8/1999 | Stark .......................... 709/224 |
| 5,970,482 A | | 10/1999 | Anand et al. |
| 5,983,267 A | * | 11/1999 | Shklar et al. ................ 709/217 |
| 5,999,940 A | * | 12/1999 | Ranger .................... 707/103 R |
| 6,094,649 A | * | 7/2000 | Bowen et al. .................. 707/3 |
| 6,138,157 A | * | 10/2000 | Welter et al. ............... 709/224 |

(Continued)

OTHER PUBLICATIONS

Network Working Group. "A Method for Web Robots Control", Internet Draft, [online], [retrieved on Jul. 17, 2000]. By M. Koster. Retrieved from the Internet: <URL: http:info.webcrawler.com/mak/projects/robots/norobots-rfc.html>.*

Richard W. Walker, "Data Warehousing and the Web (Internet/Web/Online Service)", Government Computer News vol. 18, Issue 4, Feb. 22, 1999 pp1–4.*

Network Working Group. "A Method for Web Robots Control", Internet Draft, [online], [retrieved on Jul. 17, 2000]. Retrieved from the Internet: <URL: http:info.webcrawler.com/mak/projects/robots/norobots-rfc.html>.*

Amy Rogers, "The Net Gets Pushy—Tibco Garners Support for Publish–and–Subscribe Scheme", Communications Week Issue 642, Dec. 16, 1996, pp. 1–3.

Richard W. Walker, "Data Warehousing and the Web (Internet/Web/Online Service)", Government Computer News vol. 18, Issue 4, Feb. 22, 1999, pp. 1–4.

Cast, "Welcome to Bobby 3.1.1", [online], [retrieved on Jul. 19, 2000]. Retrieved from the Internet <URL: http://www.cast.org/bobby/.

Network Working Group. "A Method for Web Robots Control", Internet Draft, [online], [retrieved on Jul. 17, 2000], Retrieved from the Internet: <URL: http:info.webcrawler.com/mak/projects/robots/norobots-rfc.html.

"Robots Exclusion". [online], [retrieved on Jul. 19, 2000]. Retrieved from the Internet: <URL: http:info.webcrawler.com/mak/projects/robots/exclusion.html.

(Continued)

*Primary Examiner*—Hosain Alam
*Assistant Examiner*—Benjamin R Bruckart
(74) *Attorney, Agent, or Firm*—David W. Victor; Konrad Raynes & Victor LLP

(57) ABSTRACT

Disclosed is a method, system, and program for searching a data repository managed by a content provider to gather indexable metadata on content at addresses locations at the data repository. Settings capable of being customized by the content provider are accessed. The customized settings provide instructions on how to search the content provider's data repository. The content of content pages at the content provider's data repository is accessed in accordance with instructions included in the accessed customized settings. Metadata from accessed content pages is generated and added to an index of metadata for accessed addressable locations at the data repository.

51 Claims, 6 Drawing Sheets

U.S. PATENT DOCUMENTS

| | | | | | |
|---|---|---|---|---|---|
| 6,145,003 | A | * | 11/2000 | Sanu et al. | 709/225 |
| 6,151,624 | A | * | 11/2000 | Teare et al. | 709/217 |
| 6,167,405 | A | * | 12/2000 | Rosensteel et al. | 707/102 |
| 6,192,364 | B1 | * | 2/2001 | Baclawski | 707/10 |
| 6,253,198 | B1 | * | 6/2001 | Perkins | 707/3 |
| 6,263,313 | B1 | * | 7/2001 | Milsted et al. | 705/1 |
| 6,263,364 | B1 | * | 7/2001 | Najork et al. | 709/217 |
| 6,434,548 | B1 | * | 8/2002 | Emens et al. | 707/3 |
| 2001/0039563 | A1 | * | 11/2001 | Tian | 709/202 |

OTHER PUBLICATIONS

"Web Server Administrator's Guide to the Robots Exclusion Protocol". [online], [retrieved on Jul. 19, 2000]. Retrieved from the Internet: <URL: http:info.webcrawler.com/mak/projects/robots.exclusion-admin.html.

"The Web Robots FAQ . . . ", [online], [retreived on Jul. 17, 2000]. Retrieved from the Internet: <URL: http:info.webcrawler.com/mak/projects/robots/faq.html.

Martijn Koster, "Robots in the Web: Threat or Treat?". [online]. Nexor 1995 [retrieved on Jul. 17, 2000]. Retreived from the Internet: <URL: http:info.webcrawler.com/mak/projects/robots/threat-or-treat.html.

Oasis. "A Robots Processing Instruction for XML Documents" [abstract] [online] The XML Cover Pages, XML Articles and Papers 1999 Jul.–Dec. Apr. 2000 [retreived on Jul. 18, 2001]. Retrieved from the Internet: <URL: http://xml.coverpages.org/smlPapers1999H2.html.

* cited by examiner

METHOD, SYSTEM, AND PROGRAM FOR GATHERING INDEXABLE METADATA ON CONTENT AT A DATA REPOSITORY

BACKGROUND OF THE INVENTION

1. Field of the Invention

The present invention relates to a method, system, and program for gathering indexable metadata on content at an electronic data repository.

2. Description of the Related Art

To locate documents on the Internet, users typically use an Internet search engine. Internet users enter one or more key search terms which may include boolean operators for the search, and transmit the search request to a server including a search engine. The search engine maintains an index of information from web pages on the Internet. This index provides search terms for a particular Web address or Universal Resource Locator (URL). If the index terms for a URL in the search engine database satisfy the Internet user search query, than that URL is returned in response to the query.

Search engine providers need to constantly update their URL database to provide a more accurate and larger universe of potential search results that may be returned to the user. Search engine companies sometimes employ a robot that searches and categorizes Web pages on the basis of metatags and content in the located HTML pages. A robot is a program that automatically traverses the Web's hypertext structure by retrieving an HTML page, and then recursively retrieving all documents referenced from the retrieved page. Web robots released by search engines to access and index Web pages are referred to as Web crawlers and Web spiders.

Search engines having a database of indexable terms for URLs generated by robots are quite common and popular. However, some of the noticeable disadvantages of such robot generated URL databases is that periodic updates to the URL web site may render the URL database inaccurate and outdated until the robot rechecks a previously indexed page. Further, search engine robots are currently designed to search for HTML pages and parse HTML content into index search terms in the search engine database. However, many web pages provide content in formats that are not accessible or parseable to prior art search engine robots that are designed to traverse HTML pages, such as content encoded in various multi-media formats, e.g., MPEG, SHOCKWAVE, ZIP files, etc. Further, web site content may be dynamic and accessible by providing a search term that is then used by a program, e.g., the Common Gateway Interface (CGI), Java programs, Microsoft Active Server pages, etc., to query a database and return search results. Such dynamic data accessible through queries is typically not identified by prior art search engine robots and indexed in the search engine URL database.

A still further disadvantage is that Web robots have been known to overload web servers and present security hazards. For this reason, many web sites use a firewall that restricts the search engine web robot from accessing and cataloging the content, even when the web site provider would want their information publicly available. Web site providers may also limit a web robot's access to a site by creating a "robot.txt" file that indicates URLs on the site that the robot is not permitted to access and index. Such limitations of search engine web robots may prevent the web robot from accessing relevant web pages that would be of significant interest to search engine users.

Some search engines use a manual taxonomist. For instance Yahoo receives a manual submission of a web page and then categorizes the web page for inclusion in its database. This approach may be very time consuming. Further, the manual taxonomical approach cannot catalog as many pages as a robot approach that continually traverses the Internet, i.e., World Wide Web, for new pages and that is not limited to content that is submitted by users.

Thus, there is a need in the art for an improved technique for cataloging web pages.

SUMMARY OF THE PREFERRED EMBODIMENTS

To overcome the limitations in the prior art described above, preferred embodiments disclose a method, system, and program for searching a data repository managed by a content provider to gather indexable metadata on content at addresses locations at the data repository. Settings capable of being customized by the content provider are accessed. The customized settings provide instructions on how to search the content provider's data repository. The content of content pages at the content providers data repository is accessed in accordance with instructions included in the accessed customized settings. Metadata from accessed content pages is generated and added to an index of metadata for accessed addressable locations at the data repository.

In further embodiments, the accessed customizable settings may provide addressable locations at the content provider's data repository provided by the content provider. In such case, accessing the content pages includes accessing the content pages at the provided addressable locations, wherein metadata is generated for the accessed content pages.

Still father, the accessed customizable settings further provide query terms for at least one provided addressable location. For each provided addressable location for which there are query terms, the provided query terms are used at the provided addressable location to obtain query results. Metadata is then generated from the obtained query results to add to the index of metadata for accessed addressable locations at the data repository.

In still further embodiments, the accessed customizable settings further indicate validation checking programs. Bach validation checking program indicated in the accessed settings is executed against each accessed content page. A validation output result for each accessed content page is generated with each validation checking program describing characteristics of the content page. Metadata is generated from the validation output result to add to the index of metadata for accessed addressable locations at the data repository.

Still further, a determination is made of a parser capable of parsing an embedded file referenced in the content page. The content of the referenced embedded file is parsed and metadata is generated for the parsed content of the embedded file to add to the index.

Preferred embodiments provide a technique for searching data repositories to gather indexable metadata for URLs at the data repository that allows the owner of the data repository greater control over how metadata is gathered. For instance, preferred embodiments allow the content provider to specify URLs to search for indexable metadata. Moreover, with preferred embodiments, metadata may be gathered for content encoded in formats not accessed by prior art search robots, such as content in multimedia files such as movie files, Shockwave files, ZIP files, etc. Still further, with preferred embodiments, the data repository owner may control what metadata is provided by selecting validation checking programs to generate metadata indicating whether the content at the URL satisfies certain validation criteria or satisfies selected qualifiers.

These preferred embodiment techniques are an improvement over the current art where Web robots search only for content in a text format at the URL and do not access embedded files in non-textual encoding, such as multi-media files or other compressed files. Further, by allowing the data repository owner to tailor how URLs are searched and metadata is gathered, the data repository owner can improve the indexable metadata available for the data repository, thereby improving the quality of search results.

Moreover, the preferred embodiment collection tool may be used by a data warehouse company that is engaged in the commercial gathering of metadata on URL pages to gather highly relevant metadata for URL sites. The data warehouse can provide or sell subscriptions to content providers to gather metadata on the subscriber URLs and then sell or license metadata to interested parties.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
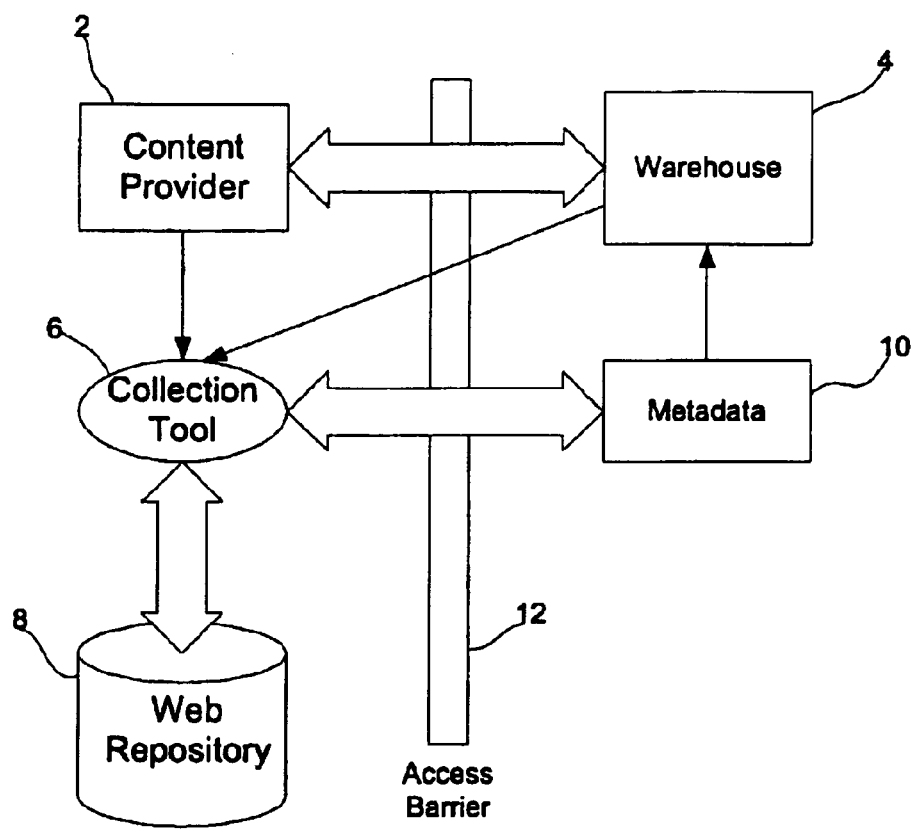
FIG. 1 illustrates a relationship between a content provider and warehouse collecting indexable metadata for data repositories in accordance with preferred embodiments of the present invention.

FIG. 1 illustrates a relationship established between a content provider 2 and a metadata warehouse 4. The metadata warehouse 4 gathers indexable metadata on URLs from different content site owners 2. The metadata warehouse 4 may provide this information to a search engine provider to use to update its URL database. Alternatively, the metadata warehouse 4 may be part of the search engine provider that gathers indexable metadata for the search engine database. The content provider 2 wants to make information on its web site available to the metadata warehouse 4 in order to allow Internet users to locate URLs at its site when doing searches. The browsable content of the content provider 2 is maintained in a repository 8. An Internet user could access data in the repository 8 by presenting a URL. If the repository includes dynamic data, then the Internet user may have to provide parameters along with a CGI command to access the dynamic data in the repository 8. The data repository 8 may include HTML pages as well as non-HTML content accessible over the Internet. The non-HTML content in the data repository 8 could include dynamic data, data maintained in file format requiring a plug-in application to render or process, such as a movie file, ShockWave file, or any other multi-media formal The metadata warehouse 4 provides a collection tool 6, described in detail below, that would search the repository 8 for information on the content at the URLs in the repository 8 and generate metadata 10 based on the content at accessed URLs in the repository 8. This metadata 10 would then be provided to the warehouse 4, preferably over a network connection such as the Internet. The collection tool 6 may be executed by a warehouse 4 server to search the repository 8 from an external location. Alternatively, the content provider 2 may execute the collection tool 6 on a content provider 2 computer capable of accessing the repository 8 to execute and gather metadata 10 to transmit back to the warehouse 4 server.

FIG. 1 illustrates the presence of an access barrier 12 which, would prevent prior art web robots from collecting indexable metadata on the URLs in the content provider's 2 repository 8. This access barrier 12 may comprise an encoding format, e.g., MPEG (or any other multimedia file format), Shockwave, ZIP files, CGI, Extended Markup File (XML), a Java program, etc., that is not accessible to prior art robots that typically are only capable of parsing and gathering information on HTML web pages. Moreover, the access barrier 12 may comprise a firewall that prevents robots from traversing the repository 8 URLS.

Figure 2:
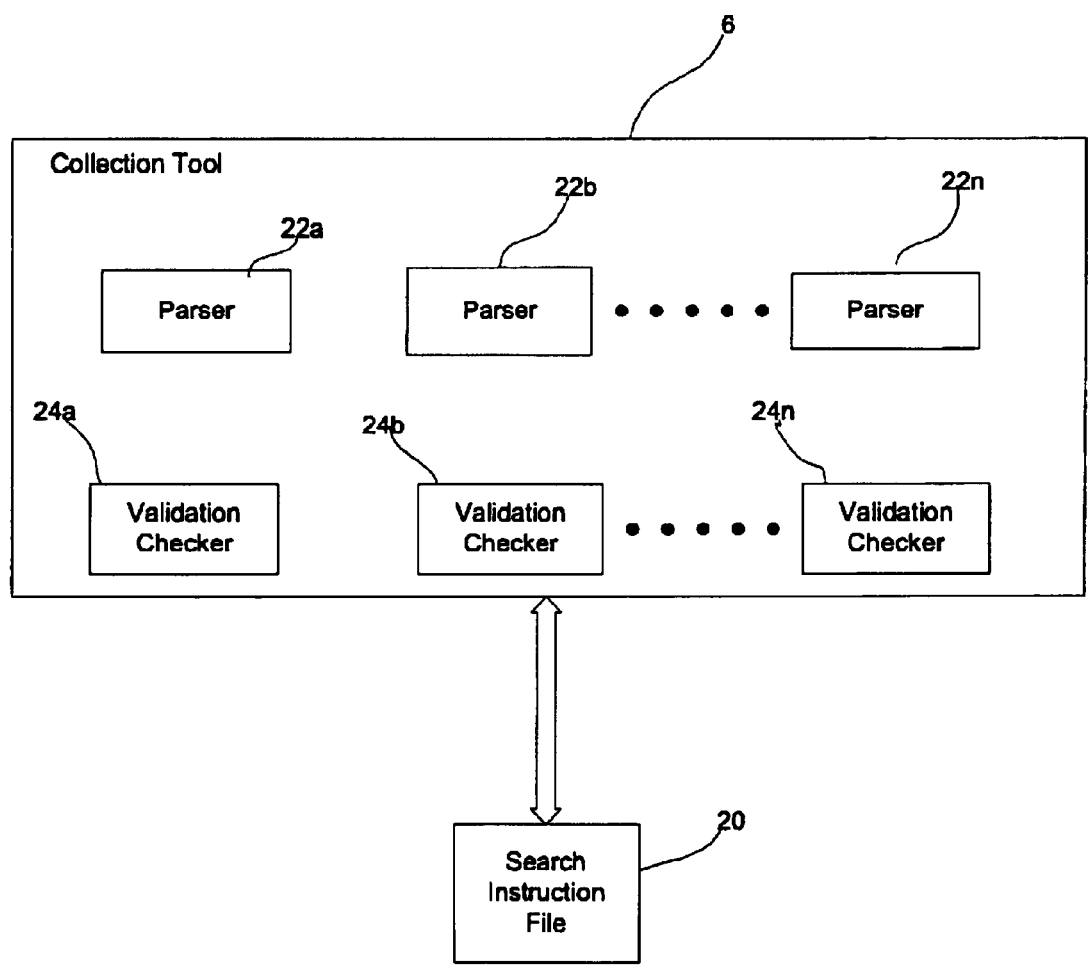
FIG. 2 illustrates program components of a collection tool used to gather indexable metadata at URLs in accordance with preferred embodiments of the present invention.

FIG. 2 illustrates program components within the collection tool 6. The collection tool 6 includes robot type functions known in the art for traversing web pages and is designed to gather indexable metadata from content at URLs in the repository 8. The collection tool 6 determines its modus operandi of searching based on a structured document referred to as a search instruction file 20. The search instruction file 20 may be stored in the content provider's repository 8 at a URL that the collection tool 6 is programmed to access. Alternatively, when the warehouse 4 provides the content provider 2 the collection tool 6, the search instruction file 20 may be included in the collection tool 6 installation package and installed with the collection tool 6 files.

The collection tool 6 would further include parsers 22a, b, . . . n that are capable of parsing and gathering data from different content encodings, such as HTML, XML, Shockwave, MPEG, JPEG, ZIP files or any other multimedia content format or compression type. These parsers 22a, b . . . n allow the collection tool 6 to gather indexable metadata from numerous type of content types available at web pages. In this way, in preferred embodiments, the indexable metadata 10 is not limited to content encoded in HTML or other text formats, but may include information on content encoded in other formats, such as multimedia file formats.

The collection tool 6 further includes validation checkers 24a, b . . . n that are programs that process the page at the URL to determine whether the pages satisfies certain predetermined conditions. The output of such validation checkers 24a, b . . . n indicate the analyzed Web page's conformance to certain standards and conditions. This validation checker output may be added to the metadata for the Web page. For instance, the validation checker 24a, b, . . . n may comprise anyone of the following validation checker programs:

World Wide Web Consortium (W3C) HTML Validation Service: checks HTML pages to determine their conformance to W3C HTML and XHTML recommendations and standards, as well as XML well-formedness.

XML Wellformedness Checker and Validator: checks an XML document for well-formedness and (optionally) validity.

BOBBY: is a web-based tool that analyzes web pages for their accessibility to people with disabilities. BOBBY's analysis of accessibility is based on the W3C Web Content Accessibility Guidelines. For example, to become Bobby approved, a Web site must: provide text equivalents for all non-text elements (i.e., images, animations, audio, video); provide summaries of graphs and charts; ensure that all information conveyed with color is also available without color, clearly identify changes in the natural language of a document's text and any text equivalents (e.g., captions) of non-text content; organize content logically; and clearly provide alternative content for features (e.g., applets or plug-ins) that may not be supported Security: A validation checker 24a, b, . . . n may determine any security settings or security guarantees and return indexable information on such security settings.

Privacy: A validation checker 24a, b, . . . n may determine any privacy guarantee or any branded logos or seals of approval concerning the privacy conditions at the URL, such as the TRUSTe seal of approval, which indicates the approval and participation in the TRUSTe privacy program.

Ratings or Awards: A validation checker 24a, b, . . . n may determine whether the site has any specified ratings or awards. In preferred embodiments, the content provider 2 may specify to the warehouse 4 any particular ratings or awards.

"Best Viewed By" A validation checker 24a, b, . . . n may determine whether the web page at the URL indicates a preferred web browser to use for viewing the Web page.

Endorsements and Approvals: A validation checker 24a, b, . . . n may determine whether the site has any particular endorsements or approvals. In preferred embodiments, the content provider 2 may specify to the warehouse 4 any particular endorsements and approvals to check For instance, the content provider 2 may request that the collection tool 6 check the page for endorsement from a particular religious organization to ensure a certain level of approval.

Warning: A validation checker 24a, b, . . . n may determine whether the site has any warnings, such as "No one under 18", "Adult Content", etc. In preferred embodiments, the content provider 2 may specify to the warehouse 4 any particular warnings to check.

The validation checkers 24a, b, . . . n may check for any other characteristics of a web page or the content therein. Moreover, the validation checkers 24a, b, . . . n may include parser programs for different content encodings to review characteristics of non-HTML pages. For instance, a validation checker 24a, b, . . . n may parse a movie file, e.g., MPEG or an Apple QuickTime file, to determine whether there is any content warning, e.g., Adult Content, Graphic Violence, "R" rated, "XXX" rated, etc.

The validation checkers 24a, b . . . n may utilize the parsers 22a, b . . . n to examine the content file or, alternatively, the validation checkers 24a, b, . . . n may include their own parser to examine the page content.

Figure 3:
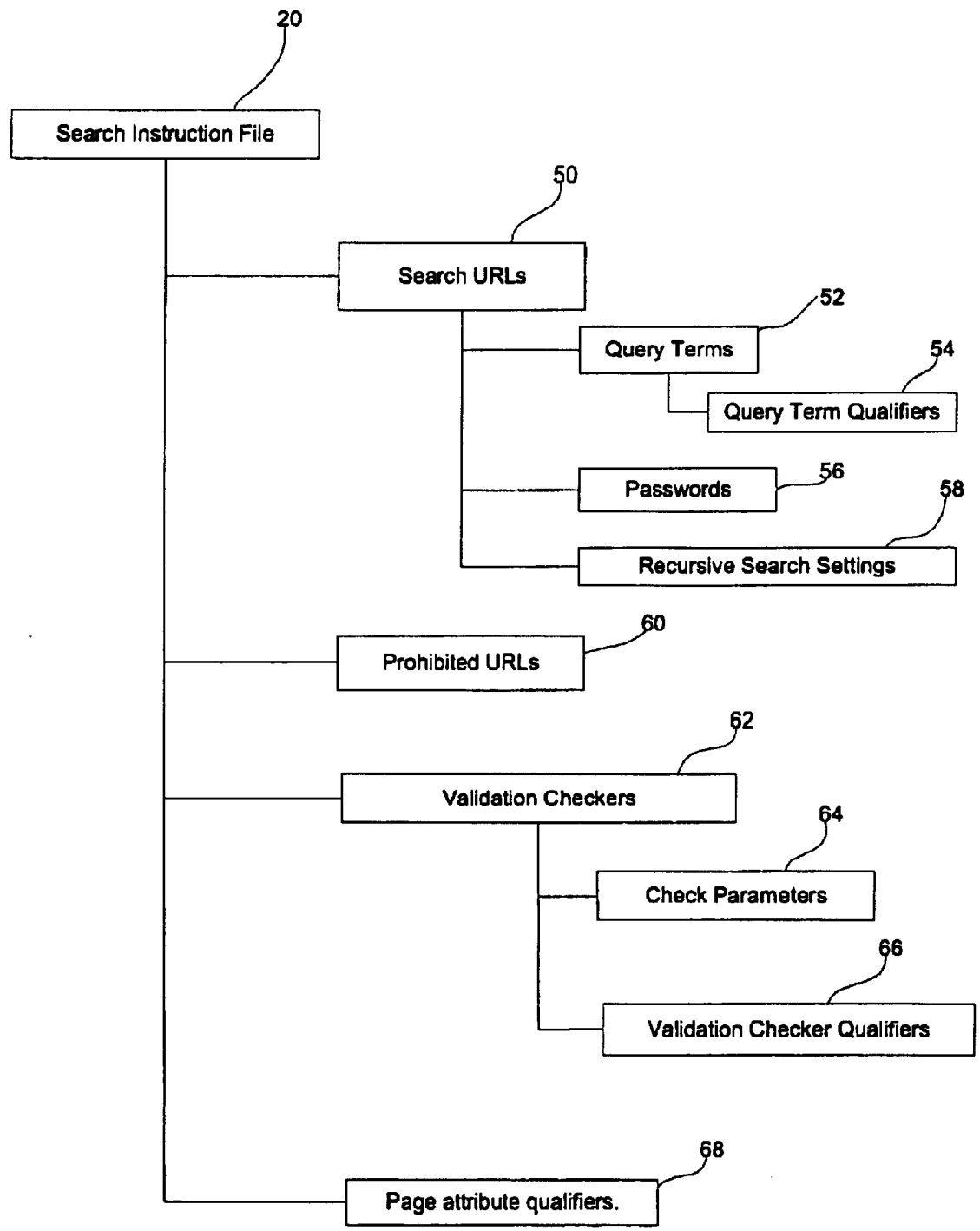
FIG. 3 illustrates a structure of a file used to control how the collection tool searches URLs in accordance with preferred embodiments of the present invention.

FIG. 3 illustrates components within the search instruction file 20 that instruct the collection tool 6 on how to process the URLs in the repository 8. In preferred embodiments, the content provider 2 would configure the search instruction file 20 to control how the collection tool 6 searches the repository 8. A search URLs 50 components indicates URLs that the collection tool 6 should access and search according to the other components. The query terms component 52 provides a list of search terms for a specified URL for the collection tool 6 to apply against that URL to access dynamic data through the web page at the URL. The repository 8 may include CGI or Java programs to access and generate dynamic data in response to the query terms. The collection tool 6 may construct a URL including a search term to present to the page when performing queries at the URL page. A query term qualifiers 54 provides predicates to apply against the query results for one or more query terms to determine if the query result satisfies the qualifier predicate.

A passwords component 56 indicates passwords for the collection tool 6 to use at a particular URL to access data at that URL. The password(s) would allow the collection tool 6 to proceed to a protected site or search for pages behind a firewall. The recursive search settings component 58 indicates how the collection tool 6 is to search URL links at the accessed URL listed in the search URLs 50. For instance, the setting 56 may instruct the collection tool 6 to recursively search all links at a URL. Alternatively, the setting 56 may instruct not to search any links beyond the URL, or limit the depth or extent of recursive searching, The prohibited URLs component 60 indicates URLs that the collection tool 6 is prohibited from accessing. This component 60 is used to prevent the collection tool 6 from accessing a particular URL that would be recursively accessed through a link at a URL listed in the search URLs 50. The validation checkers component 62 indicates one or more validation checkers 24a, b, . . . n that the collection tool 6 should execute against an accessed page. The check parameters component 64 indicates specific characteristics the validation checker 24a, b, . . . n should check for on the examined Web page. For instance, the parameters 64 may indicate seals of approval, endorsements, warnings, ratings, etc., that the validation checker 24a, b . . . n should search upon. If no check parameters are provided for a validation checker 60, then the validation checker 60 does not require any user parameters to perform its checking, such as the case with BOBBY or XML well formedness checkers that determine whether a page complies with certain predetermined parameters.

Validation checker qualifiers 66 provide qualifiers to apply against the output from a validation checker 24a, b, . . . n checking the content at the URL. If the output of the validation checker 24a, b, . . . n for the URL does not satisfy the qualifier predicate, then no metadata would be returned for that URL and that non qualifying URL would not be indexed for inclusion with the metadata provided to the warehouse 4. For instance, the qualifier may indicate to not return search results of pages that are not BOBBY compliant. If the BOBBY validation checker 24a, b, . . . n determined that the content at the URL was not BOBBY compliant, then according to the BOBBY qualifier, metadata for that URL would not be returned and that URL would not be indexed. Alternatively, metadata can be returned that indicates the non-compliance of the checked URL page, or some rating indicating a non-compliance. Such metadata indicating non-compliance could allow Internet searchers who are interested to locate non-compliant pages. There may be a separate validation checker qualifier 66 for each validation checker 62 selected in the search instruction file 20. If there is no validation checker qualifier 66, then metadata for that page is returned regardless of the output from the validation checker 24a, b, . . . n. If a qualifier for the output from a validation checker 24a, b, . . . n is not satisfied, then the collection tool 6 may either not provide any data for that non-qualifying URL. Alternatively, the collection tool 6 may not include the non-qualifying output with the metadata for the URL, but allow other qualifying metadata for the URL to be provided to the warehouse 4. In this way, the content provider 2 can control the type of metadata provided to tailor how the URL will be returned in response to Internet user search queries.

A page attribute qualifier component 68 indicates attributes to use to qualify a page, such as the date of the content, byte size, etc.

The warehouse 4 may develop a graphical user interface (GUI) to allow the content provider 2 to set search settings in the search instruction file 20. For instance, if the content provider 2 communicates with the warehouse 4 over the Internet, then the content provider 2 may use a Web browser GUI to select search settings in the search instruction file 20 that will control how the collection tool 6 searches the repository 8.

The GUI could also allow the content provider 2 to select validation checkers 24a, b, . . . n to use and then select qualifiers 66 for the validation checkers 24a, b, . . . n. This allows the content provider 2 to customize how the collection tool 6 will search its repository 8.

Figure 4:
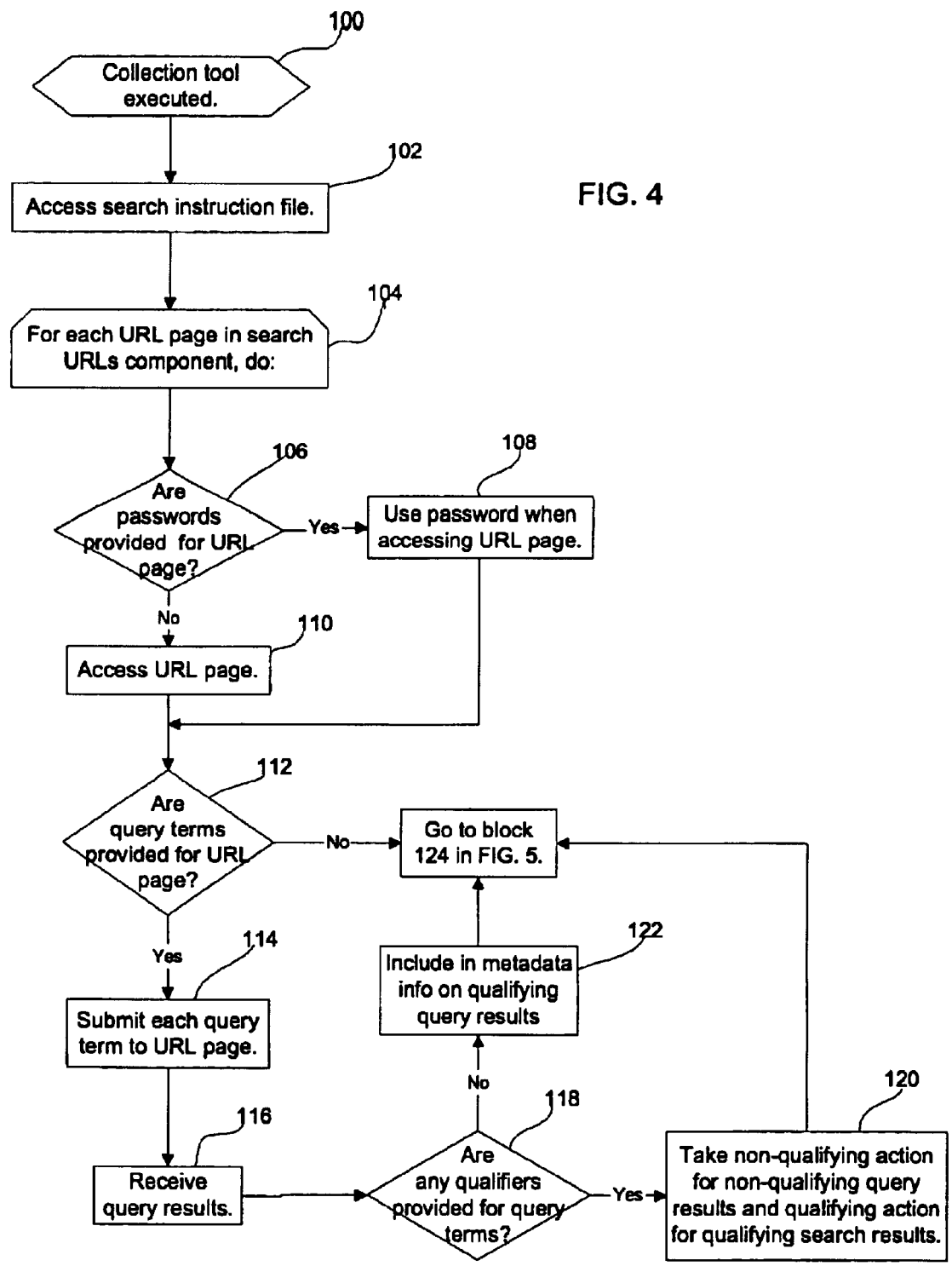
FIGS. 4, 5, and 6 illustrate logic performed by the collection tool to gather indexable metadata from URLs in accordance with preferred embodiments of the present invention.

FIG. 4 illustrates program logic implemented in the collection tool 6 to perform the search operation on one or more URL pages the content provider 2 submits to the warehouse 4. Control begins at block 100 with the collection tool being executed. The content provider 2 may run the collection tool 6 internally within a firewall including the repository 8. Alternatively, the warehouse 4 may run the collection tool 6 from a server external to the firewall including the repository 8. The content provider 2 and warehouse 4 may agree upon a regular schedule for running the collection tool 6 to ensure that the warehouse URL database is regularly updated with indexable metadata for the repository 8 URLs. Further, the content provider 2 may determine when to run the collection tool 6, such as after any updates or modifications to the content in the repository 8.

Once executed, the collection tool 6 accesses the search instruction file 20, which may be maintained in a directory at the content provider 2 computer running the collection tool 6, the repository 8, or the warehouse 4 server. Between block 104 and 160, the collection tool 6 performs the steps at block 106–148 for each URL page in the search URL list 50. If (at block 106) there is a password provided for the URL page being considered, then the collection tool uses (at block 108) that password when accessing the URL page; otherwise, the collection tool 6 accesses (at block 110) the URL page. If (at block 112) there are query terms provided for that URL page in the query terms list 52, then the collection tool 6 submits (at block 114) each provided query term to the URL page to obtain dynamic data for that search term. After receiving (at block 116) the query results, the collection tool 6 determines (at block 118) whether there are any qualifiers in the query term qualifiers components 54 for all the query terms or particular query terms. Thus, certain qualifiers may apply to the query results for all query terms or the query results for specific query terms. If there are such qualifiers, then the collection tool 6 performs (at block 120) the non-qualifying action with respect to those query results that do not satisfy the qualifiers and a qualifying action for those query results that satisfy the qualifiers. The non-qualifying action may comprise not including the non-qualifying query results in the metadata for the URL page and/or including information that the query results did not qualify. The qualifying action may comprise including the qualifying query results in the metadata for the URL page and/or including information that the query results qualified. If there are no qualifiers for the search terms, then the collection tool 6 would append (at block 122) information on the query results to the metadata for the URL page.

Figure 5:
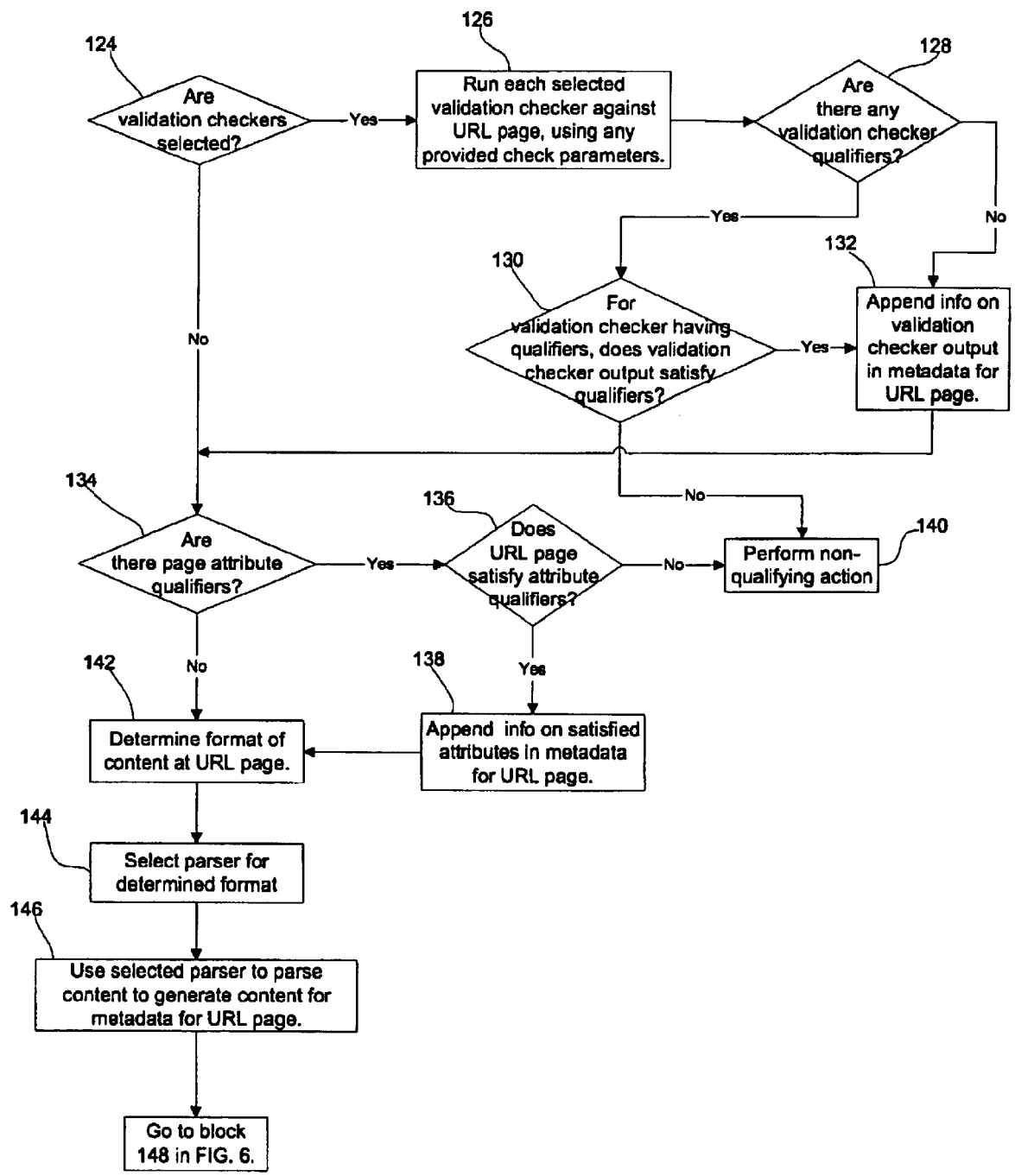

From block 120 or 122 control proceeds to block 124 in FIG. 5. At block 124, the collection tool 6 determines (at block 124) whether the validation checkers component 62 indicates that validation checkers 24a, b, . . . n are selected to run. If so, then the collection tool 6 runs (at block 126) each selected validation checker 24a, b, . . . n against the URL page, using any check parameters 64 provided for the validation checker 24a, b, . . . n. If (at block 128) there are any validation checker qualifiers 66 for a particular validation checker 24a, b, . . . n, then for those validation checkers that have qualifiers, the collection tool 6 determines (at block 130) whether the validation checker output satisfies the qualifier(s). If the qualifiers are satisfied (from the yes branch of 130) or if there are no validation checker qualifiers (the no branch of block 128), then the collection tool 6 appends (at block 132) information on the validation checker output in the metadata for the URL page. If the validation checker output does not satisfy the qualifiers, then the collection tool 6 performs (at block 140) the non-qualifying action, which may comprise not including any information on the search URL page in the metadata and proceeding to block 160 to consider the next URL page in the search URLs 50. Alternatively, the non-qualifying action may involve the collection tool 6 including specific information in the metadata for the URL page that the qualifier was not satisfied and then proceeding to block 134 to gather further metadata for the URL page as instructed in the search instruction file 20.

After considering any selected validation checkers in the validation checkers component 62 and if the validation checker output satisfied any qualifiers, then control proceeds from blocks 124 or 132 to block 134. If (at block 134) there are any page attribute qualifiers 68, then the collection tool 6 determines (at block 136) whether the URL page satisfies the attribute qualifiers. If so, then the collection tool 6 appends (at block 138) information on the satisfied attributes in the metadata for the URL page. Otherwise, if the page attributes are not satisfied, then the collection tool 6 performs (at block 140) the non-qualifying action, which may comprise not including any information on the search URL page in the metadata and proceeding to block 160 to consider the next URL page in the search URLs 50. Alternatively, the non-qualifying action may involve the collection tool 6 including specific information in the metadata for the URL page that the qualifier was not satisfied and then proceeding to block 142 to gather further metadata for the URL page as instructed in the search instruction file 20.

From the no branch of block 134 or block 138, control proceeds to block 142 where the collection tool 6 determines the format of the URL page, e.g., XML, HTML, DHTML and selects (at block 144) a parser 22a, b, . . . n capable of parsing the URL page format. The collection tool 6 then uses the selected parser 22a, b, . . . n, i.e., calls the parser, to parse (at block 146) the content to generate metadata for the URL page. The parser 22a, b, . . . n may generate indexable metadata from the URL page in a manner known in the art. For instance, the parser 24a, b, . . . n may index the full body of visible text, but may exclude commonly used words, e.g., "the", "and", etc. may index keywords included in a special keyword metatag in the document, and/or may perform word stemming to include variations of a word, e.g., politics, politician, political, etc., in the indexable metadata.

If (at block 148) the URL page includes a reference to an embedded file, such as embedded images, Shockwave files, ZIP files, or any other encoded file, then for each reference to an embedded file, the collection tool 6 selects (at block 150) a parser 22*a, b, . . . n* capable of parsing the embedded file. An embedded file is distinguished from a file referenced through a hypertext link, such as a hypertext link created using the HTML "HREF" statement. A linked file is an HTML page the browser accesses. An embedded file is typically referenced as an Applet or using an object tag that specifies a plug-in application to use to open and render the embedded file, or make the content of the embedded file available for processing. The collection tool 6 uses (at block 152) the selected parser to parse each embedded file and generate indexable metadata from the embedded file content to append to the metadata for the URL page. Either the parser or collection tool 6 would use the plug-in application indicated in the object tag for the embedded file to process or render the content of the embedded file. From the no branch of block 148 or block 152, the collection tool determines (at block 154) whether the URL page includes links to other URL pages. If links are included and the recursive search settings 58 do not restrict (at block 156) recursive searching, then the collection tool 6 performs (at block 158) steps 106 to 158 for each linked URL page that is not listed as a prohibited URL 60. From the no branch of block 154, the yes branch of block 156 or from block 158, control returns (at block 160) to consider the next URL page listed in the search URLs 50.

Preferred embodiments provide a URL metadata collection tool 6 for searching URLs at a content provider's site that is an improvement over current search robots and agents. With the preferred embodiments, the content provider 2 can control when searches of its repository 8 will occur to ensure that indexable metadata for the URLs in the repository 8 are current Further, by allowing the content provider 2 to control the scheduling of searches, the content provider 2 can avoid the situation in the current art where search agents or robots may overload the content provider's 2 server. For instance, the content provider 2 can schedule the collection tool 6 searches in off-peak hours.

Moreover, with preferred embodiments, the content provider 2 can specify particular URLs for the collection tool 6 to search and gather indexable metadata. Still further, the collection tool 6 is capable of gathering indexable metadata for multi-media content and content encodings that are currently not indexed by search engines, such as Shockwave files, ZIP files, and other non-text multimedia files. Moreover, with the preferred embodiments, the content provider 2 can control whether information is indexed by validation checking pages and setting qualifiers that may exclude metadata from pages that do not satisfy certain criteria. In this way, preferred embodiments provide an improved and more controllable tool for gathering indexable metadata on URL pages at a content provider 2 web site and allowing the content provider 2 to control how indexable metadata is gathered.

Once the warehouse 4 gathers the metadata 10 from different content providers 2, then the warehouse 4 can provide the indexable metadata to search engine companies to include in their search engine databases or to other interested parties. Moreover, a data warehouse may use the collection tool as part of a business model to enroll subscribers who want to control how metadata is gathered about their URLs. The data warehouse can use the collection tool to develop a database of metadata for URLs for commercial exploitation. Further, the data warehouse could have advertisements displayed when the collection tool program is executed or configured to generate revenue when content providers use the collection tool.

ALTERNATIVE EMBODIMENTS AND CONCLUSIONS

The following describes some alternative embodiments for accomplishing the present invention.

The preferred embodiments may be implemented as a method, apparatus or program using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, an those skilled in the art will recognize that many modifications may be made to this configuration without departing from the scope of the present invention. Such information bearing media, when carrying computer-readable instructions that direct the functions of the present invention, represent alternative embodiments of the present invention.

Preferred embodiments provide specific program components included in the collection tool to use to provide additional metadata indexing capabilities. In further embodiments, the collection tool may examine pages for criteria other than those described herein.

Preferred embodiments described particular settings that the content provider may configure in the search instruction file 20. In further embodiments, the content provider 2 may configure different types of settings than those described herein to provide additional levels of control over how the collection tool 6 searches Web pages and the metadata returned.

Figure 6:
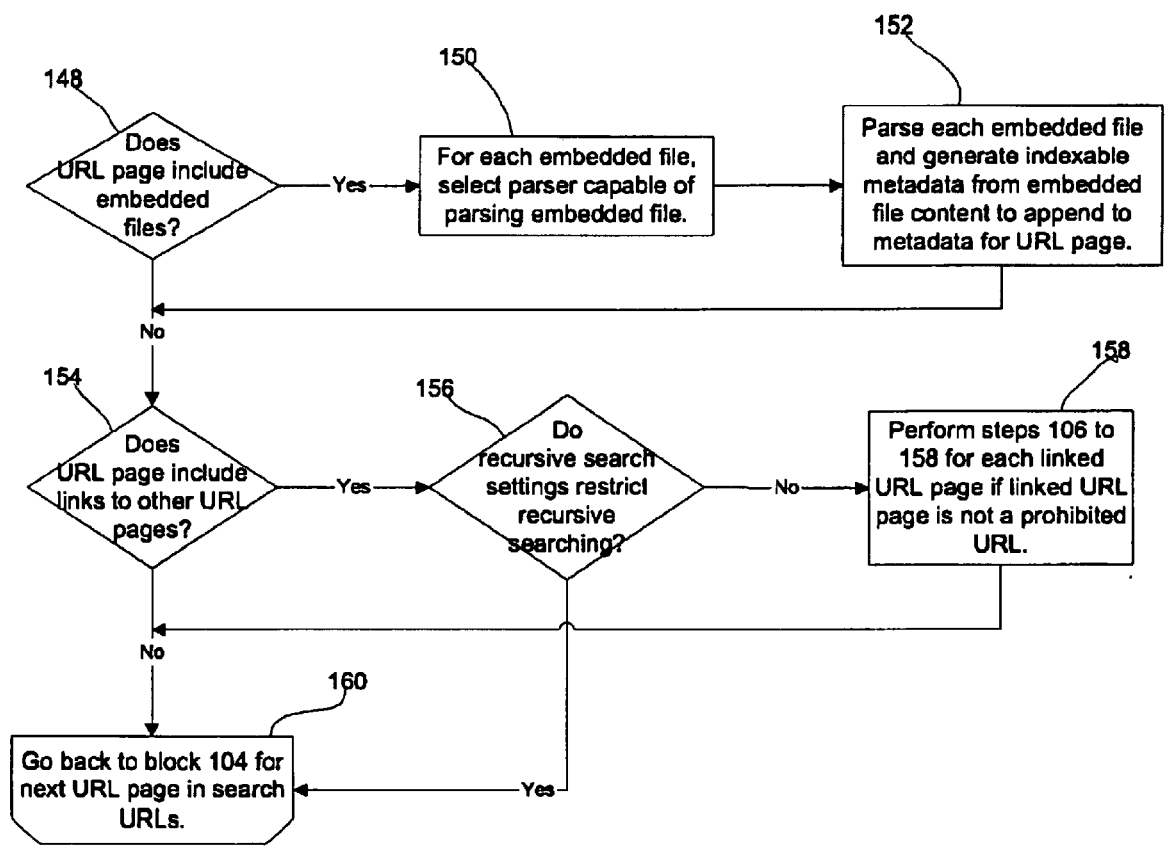

The preferred logic of FIGS. 4–6 describes specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

In summary, the preferred embodiments provide a method, system, and program for searching a web site managed by a content provider to gather indexable metadata on content at addresses locations at the web site. Settings capable of being customized by the content provider are accessed. The customized settings provide instructions on how to search the content provider's web site. The accessed customized settings are used to control the processing of content pages at the content providers web site. Metadata from accessed content pages is generated and added to an index of metadata for accessed addressable locations at the web site.

The foregoing description of the preferred embodiments of the invention has been presented for the purposes of illustration and description. It is not intended to be exhaustive or to limit the invention to the precise form disclosed. Many modifications and variations are possible in light of the above teaching It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for searching data repositories managed by different content providers to gather indexable metadata on content at addressable locations at the data repositories, comprising:

accessing customizable settings capable of being customized by the content provider, wherein the customizable settings provide an addressable location of at least one content page in the data repository and a parameter comprising a query term for at least one included addressable location;

for each provided addressable location for which there is the query term, accessing the content page at the addressable location at the content provider's data repository indicated in the customizable settings;

processing the accessed content page using the provided query term at each provided addressable location to obtain query results; and generating metadata from the obtained query results to add to an index of metadata for accessed addressable locations at the data repository, wherein customizable settings from the different content providers are accessed to generate the metadata for the accessed content pages, and wherein the index of metadata includes metadata on content from the data repositories of the different content providers.

2. The method of claim 1, wherein the customizable settings include parameters and access methods unique to an arrangement of content in the content provider's data repository, wherein the access methods process the accessed content page using the parameter.

3. The method of claim 1, wherein the addressable locations comprise uniform resource locator (URL) addresses.

4. The method of claim 1, wherein the accessed customizable settings further provide qualifiers for at least one query term further comprising:

for each query term having at least one qualifier, determining whether the query results for the query term satisfy each qualifier for the query term, wherein the metadata for the query result is generated if the query result satisfies each qualifier for the query term that generated the query result; and performing a non-qualifying action for each query result that does not satisfy each qualifier.

5. The method of claim 4, wherein the non-qualifying action comprises not including metadata for the query result in the index.

6. The method of claim 1, wherein the parameters in the accessed customizable settings further include a recursive search setting indicating whether to search hypertext links to linked addressable locations included in the accessed content page, further comprising:

accessing a content page at each linked addressable location included if the recursive search setting indicates to recursively search linked addressable locations, wherein metadata is generated for each content page recursively accessed at the linked addressable locations in the accessed content page.

7. The method of claim 6, wherein the accessed customizable settings further provide prohibited addressable locations at the data repository, wherein metadata is not generated for each content page at a linked addressable location that is one indicated prohibited address location.

8. The method of claim 1, further comprising:

determining a format of the accessed content page;

selecting one of a plurality of parsers capable of parsing the determined format; and parsing the content page using the selected parser, wherein the metadata to add to the index is generated from the parsed content page.

9. The method of claim 1, further comprising:

determining a parser capable of parsing an embedded file referenced in the content page;

parsing the content of the referenced embedded file; and generating metadata for the parsed content of the embedded file to add to the index.

10. The method of claim 9, wherein the embedded file is encoded in a multimedia format.

11. The method of claim 1, further comprising:

distributing a collection tool to content providers capable of accessing and generating metadata for content provider data repositories using the accessed customizable settings; and collecting metadata gathered from multiple content providers using the collection tool to gather metadata on their data repositories.

12. The method of claim 11, further comprising commercializing the collected metadata.

13. The method of claim 11, further comprising:

receiving an electronic subscription from content providers to use the collection tool and provide metadata.

14. A method for searching data repositories managed by different content providers to gather indexable metadata on content at addressable locations at the data repositories, comprising:

accessing customizable settings capable of being customized by the content provider, wherein the customizable settings provide an addressable location of at least one content page in the data repository and parameters for the addressable locations, wherein the parameters in the accessed customizable settings further include a password for at least one provided addressable location;

accessing the content page at the addressable location at the content provider's data repository indicated in the customizable settings;

using the provided password to access the content page at the indicated addressable location for which the password is provided;

processing the accessed content page using the parameter provided for the addressable location of the accessed content page to generate output information; and generating metadata indicating the generated output information for the accessed content page to add to an index of metadata for accessed addressable locations at the data repository, wherein customizable settings from the different content providers are accessed to generate the metadata for the accessed content pages, and wherein the index of metadata includes metadata on content from the data repositories of the different content providers.

15. A method for searching data repositories managed by different content providers to gather indexable metadata on content at addressable locations at the data repositories, comprising:

accessing customizable settings capable of being customized by the content provider, wherein the customizable settings provide an addressable location of at least one content page in the data repository and further indicate validation checking programs;

accessing the content page at the addressable location at the content provider's data repository indicated in the customizable settings;

executing each validation checking program indicated in the accessed customizable settings against each accessed content page;

generating a validation output result with the validation checking program for each accessed content page with each validation checking program describing characteristics of the content page, and generating metadata from the validation output result to add to an index of metadata for accessed addressable locations at the data repository, wherein customizable settings from the different content providers are accessed to generate the metadata for the accessed content pages, and wherein the index of metadata includes metadata on content from the data repositories of the different content providers.

16. The method of claim 15, wherein the accessed customizable settings further indicate at least one parameter to use with at least one validation checking program, further comprising:

using the at least one parameter when executing the validation checking program, wherein the validation output result further indicates characteristics of the content page related to the at least one parameter used with the validation checking program.

17. The method of claim 15, wherein the parameters in the accessed customizable settings further indicate at least one qualifier to use with at least one validation checking program, further comprising:

determining whether the validation output result satisfies the at least one qualifier provided with the validation checking program producing the output result, wherein metadata for the output result is included in the index if the output result satisfies the qualifier.

18. The method of claim 17, wherein metadata for the content page at the addressable location is not included in the index if the validation output result does not satisfy the qualifier.

19. A system for searching data repositories managed by different content providers to gather indexable metadata on content at addressable locations at the data repositories, comprising:

means for accessing customizable settings capable of being customized by the content provider, wherein the customized settings provide an addressable location of at least one content page in the data repository and a parameter in the accessed customizable settings comprising a query term for at least one included addressable location;

means for accessing the content page at each provided addressable location at the content provider's data repository indicated in the customizable settings;

means for processing each accessed content page using the provided query term at the provided addressable location to obtain query results for each provided addressable location for which there is a query term; and means for generating metadata from the obtained query results to add to an index of metadata for accessed addressable locations at the data repository, wherein customizable settings from the different content providers are accessed to generate the metadata for the accessed content pages, and wherein the index of metadata includes metadata on content from the data repositories of the different content providers.

20. The system of claim 19, wherein the customizable settings include parameters and access methods unique to an arrangement of content in the content provider's data repository, wherein the access methods process the accessed content page using the parameter.

21. The system of claim 19, wherein the addressable locations comprise uniform resource locator (URL) addresses.

22. The system of claim 19, wherein the accessed customizable settings further provide qualifiers for at least one query term, further comprising:

means for determining whether the query results for the query term satisfy each qualifier for the query term for each query term having at least one qualifier, wherein the metadata for the query result is generated if the query result satisfies each qualifier for the query term that generated the query result; and means for performing a non-qualifying action for each query result that does not satisfy each qualifier.

23. The system of claim 22, wherein the non-qualifying action comprises not including metadata for the query result in the index.

24. The system of claim 19, wherein the parameters in the accessed customizable settings further include a recursive search setting indicating whether to search hypertext links to linked addressable locations included in the accessed content page, further comprising:

means for accessing a content page at each linked addressable location included if the recursive search setting indicates to recursively search linked addressable locations, wherein metadata is generated for each content page recursively accessed at the linked addressable locations in the accessed content page.

25. The system of claim 24, wherein the accessed customizable settings further provide prohibited addressable locations at the data repository, wherein metadata is not generated for each content page at a linked addressable location that is one indicated prohibited address location.

26. The system of claim 19, further comprising:

means for determining a format of the accessed content page;

means for selecting one of a plurality of parsers capable of parsing the determined format, and means for parsing the content page using the selected parser, wherein the metadata to add to the index is generated from the parsed content page.

27. The system of claim 19, further comprising:

means for determining a parser capable of parsing an embedded file referenced in the content page;

means for parsing the content of the referenced embedded file; and means for generating metadata for the parsed content of the embedded file to add to the index.

28. The system of claim 27, wherein the embedded file is encoded in a multimedia format.

29. The system of claim 19, further comprising:
   means for distributing a collection tool to content providers capable of accessing and generating metadata for content provider data repositories using the accessed customizable settings; and
   means for collecting metadata gathered from multiple content providers using the collection tool to gather metadata on their data repositories.

30. A system for searching data repositories managed by different content providers to gather indexable metadata on content at addressable locations at the data repositories, comprising:
   means for accessing customizable settings capable of being customized by the content provider, wherein the customized settings provide an addressable location of at least one content page in the data repository and parameters for the addressable locations, wherein the parameters in the accessed customizable settings further include a password for at least one provided addressable location;
   means for accessing the content page at the addressable location at the content provider's data repository indicated in the customizable settings;
   means for using the provided password to access the content page at the indicated addressable location for which the password is provided;
   means for processing the accessed content page using the parameter provided for the addressable location of the accessed content page to generate output information; and
   means for generating metadata indicating the generated output information for the accessed content page to add to an index of metadata for accessed addressable locations at the data repository, wherein customizable settings from the different content providers are accessed to generate the metadata for the accessed content pages, and wherein the index of metadata includes metadata on content from the data repositories of the different content providers.

31. A system for searching data repositories managed by different content providers to gather indexable metadata on content at addressable locations at the data repositories, comprising:
   means for accessing customizable settings capable of being customized by the content provider, wherein the customized settings provide an addressable location of at least one content page in the data repository and further indicate validation checking programs;
   means for accessing the content page at the addressable location at the content provider's data repository indicated in the customizable settings;
   means for executing each validation checking program indicated in the accessed customizable settings against each accessed content page;
   means for generating a validation output result with the validation checking program for each accessed content page with each validation checking program describing characteristics of the content page; and
   means for generating metadata from the validation output result to add to an index of metadata for accessed addressable locations at the data repository, wherein customizable settings from the different content providers are accessed to generate the metadata for the accessed content pages, and wherein the index of metadata includes metadata on content from the data repositories of the different content providers.

32. The system of claim 31, wherein the accessed customizable settings further indicate at least one parameter to use with at least one validation checking program, further comprising:
   means for using the at least one parameter when executing the validation checking program, wherein the validation output result further indicates characteristics of the content page related to the at least one parameter used with the validation checking program.

33. The system of claim 31, wherein the accessed customizable settings further indicate at least one qualifier to use with at least one validation checking program, further comprising:
   means for determining whether the validation output result satisfies the at least one qualifier provided with the validation checking program producing the output result, wherein metadata for the output result is included in the index if the output result satisfies the qualifier.

34. The system of claim 33, wherein metadata for the content page at the addressable location is not included in the index if the validation output result does not satisfy the qualifier.

35. A program for searching data repositories managed by different content providers to gather indexable metadata on content at addressable locations at the data repositories, wherein the program comprises code implemented in a computer readable medium capable of causing a computer to perform:
   accessing customizable settings capable of being customized by the content provider, wherein the customizable settings provide an addressable location of at least one content page in the data repository and a parameter in the accessed customizable settings comprising a query term for at least one included addressable location;
   for each provided addressable location for which there is a query term, accessing the content page at the addressable location at the content provider's data repository indicated in the customizable settings;
   processing the accessed content page using the provided query term at each provided addressable location to obtain query results; and
   generating metadata from the obtained query results to add to an index of metadata for accessed addressable locations at the data repository, wherein customizable settings from the different content providers are accessed to generate the metadata for the accessed content pages, and wherein the index of metadata includes metadata on content from the data repositories of the different content providers.

36. The program of claim 35, wherein the customized settings include parameters and access methods unique to an arrangement of content in the content provider's data repository, wherein the access methods process the accessed content page using the parameter.

37. The program of claim 35, wherein the addressable locations comprise uniform resource locator (URL) addresses.

38. The program of claim 35, wherein the accessed customizable settings further provide qualifiers for at least one query term, wherein the program is further capable of causing the computer to perform:
   for each query term having at least one qualifier, determining whether the query results for the query term satisfy each qualifier for the query term, wherein the metadata for the query result is generated if the query result satisfies each qualifier for the query term that generated the query result; and performing a non-qualifying action for each query result that does not satisfy each qualifier.

39. The program of claim 38, wherein the non-qualifying action comprises not including metadata for the query result in the index.

40. The program of claim 35, wherein the parameters in the accessed customizable settings further include a recursive search setting indicating whether to search hypertext links to linked addressable locations included in the accessed content page, wherein the program is further capable of causing the computer to perform:
   accessing a content page at each linked addressable location included if the recursive search setting indicates to recursively search linked addressable locations, wherein metadata is generated for each content page recursively accessed at the linked addressable locations in the accessed content page.

41. The program of claim 40, wherein the accessed customizable settings further provide prohibited addressable locations at the data repository, wherein metadata is not generated for each content page at a linked addressable location that is one indicated prohibited address location.

42. The program of claim 35, wherein the program is further capable of causing the computer to perform:
   determining a format of the accessed content page;
   selecting one of a plurality of parsers capable of parsing the determined format; and
   parsing the content page using the selected parser, wherein the metadata to add to the index is generated from the parsed content page.

43. The program of claim 35, wherein the program is further capable of causing the computer to perform:
   determining a parser capable of parsing an embedded file referenced in the content page;
   parsing the content of the referenced embedded file; and
   generating metadata for the parsed content of the embedded file to add to the index.

44. The program of claim 43, wherein the embedded file is encoded in a multimedia format.

45. The program of claim 35, further comprising:
   distributing the program to content providers capable of accessing and generating metadata for content provider data repositories using the accessed customizable settings; and
   collecting metadata gathered from multiple content providers using the collection tool to gather metadata on their data repositories.

46. The program of claim 45, further comprising:
   receiving an electronic subscription from content providers to use the program to gather and provide metadata.

47. A program for searching data repositories managed by different content providers to gather indexable metadata on content at addressable locations at the data repositories, wherein the program comprises code implemented in a computer readable medium capable of causing a computer to perform:
   accessing customizable settings capable of being customized by the content provider, wherein the customizable settings provide an addressable location of at least one content page in the data repository and parameters for the addressable locations, wherein the parameters in the accessed customizable settings further include a password for at least one provided addressable location;
   accessing the content page at the addressable location at the content provider's data repository indicated in the customizable settings;
   using the provided password to access the content page at the indicated addressable location for which the password is provided;
   processing the accessed content page using the parameter provided for the addressable location of the accessed content page to generate output information; and
   generating metadata indicating the generated output information for the accessed content page to add to an index of metadata for accessed addressable locations at the data repository, wherein customizable settings from the different content providers are accessed to generate the metadata for the accessed content pages, and wherein the index of metadata includes metadata on content from the data repositories of the different content providers.

48. A program for searching data repositories managed by different content providers to gather indexable metadata on content at addressable locations at the data repositories, wherein the program comprises code implemented in a computer readable medium capable of causing a computer to perform:
   accessing customizable settings capable of being customized by the content provider, wherein the customizable settings provide an addressable location of at least one content page in the data repository and further indicate validation checking programs;
   accessing the content page at the addressable location at the content provider's data repository indicated in the customizable settings;
   executing each validation checking program indicated in the accessed customizable settings against each accessed content page;
   generating a validation output result with the validation checking program for each accessed content page with each validation checking program describing characteristics of the content page; and
   generating metadata from the validation output result to add to an index of metadata for accessed addressable locations at the data repository, wherein customizable settings from the different content providers are accessed to generate the metadata for the accessed content pages, and wherein the index of metadata includes metadata on content from the data repositories of the different content providers.

49. The program of claim 48, wherein the accessed customizable settings further indicate at least one parameter to use with at least one validation checking program, wherein the program is further capable of causing the computer to perform:
   using the at least one parameter when executing the validation checking program, wherein the validation output result further indicates characteristics of the content page related to the at least one parameter used with the validation checking program.

50. The program of claim 48, wherein the accessed customizable settings further indicate at least one qualifier to use with at least one validation checking program, wherein the program is further capable of causing the computer to perform:
   determining whether the validation output result satisfies the at least one qualifier provided with the validation checking program producing the output result, wherein metadata for the output result is included in the index if the output result satisfies the qualifier.

51. The program of claim 50, wherein metadata for the content page at the addressable location is not included in the index if the validation output result does not satisfy the qualifier.

* * * * *